United States Patent [19]
Connell et al.

[11] Patent Number: 5,304,627
[45] Date of Patent: Apr. 19, 1994

[54] POLYIMIDES CONTAINING PENDENT SILOXANE GROUPS

[75] Inventors: John W. Connell, Yorktown; Terry L. St. Clair, Poquoson; Paul M. Hergenrother, Yorktown, all of Va.

[73] Assignee: The United States of America as represented by the Administrator of the National Aeronautics and Space Administration, Washington, D.C.

[21] Appl. No.: 970,755

[22] Filed: Nov. 2, 1992

[51] Int. Cl.$^5$ ............... C08G 73/10; C08G 69/26
[52] U.S. Cl. ................. 528/353; 528/22; 528/26; 528/28; 528/32; 528/33; 528/34; 528/36; 528/43; 528/125; 528/126; 528/128; 528/170; 528/172; 528/173; 528/174; 528/176; 528/183; 528/185; 528/188; 528/220; 528/229; 528/351; 528/352
[58] Field of Search ............ 528/126, 353, 33, 125, 528/32, 128, 22, 26, 34, 28, 36, 183, 185, 43, 188, 220, 229, 176, 170, 174, 172, 173, 351, 352

[56] References Cited

U.S. PATENT DOCUMENTS

| | | | |
|---|---|---|---|
| 2,998,406 | 8/1961 | Bailey et al. | 528/38 |
| 3,325,450 | 6/1967 | Holub | 528/38 |
| 3,609,123 | 9/1971 | Rabilloud | 528/38 |
| 3,740,305 | 6/1973 | Hoback | 528/38 |
| 4,011,279 | 3/1977 | Berger | 528/38 |
| 4,395,527 | 7/1983 | Berger | 528/38 |
| 4,404,350 | 9/1983 | Ryang | 528/26 |

Primary Examiner—John Kight, III
Assistant Examiner—P. Hampton-Hightower
Attorney, Agent, or Firm—George F. Helfrich

[57] ABSTRACT

Novel polyimides containing pendent siloxane groups (PISOX) were prepared by the reaction of functionalized siloxane compounds with hydroxy containing polyimides (PIOH). The pendent siloxane groups on the polyimide backbone offer distinct advantages such as lowering the dielectric constant and moisture resistance and enhanced atomic oxygen resistance. The siloxane containing polyimides are potentially useful as protective silicon oxide coatings and are useful for a variety of applications where atomic oxygen resistance is needed.

11 Claims, No Drawings

POLYIMIDES CONTAINING PENDENT SILOXANE GROUPS

ORIGIN OF INVENTION

The invention described herein was made by employees of the United States Government and may be manufactured and used by or for the Government for governmental purposes without the payment of any royalties thereon or thereof.

BACKGROUND OF THE INVENTION

1. Field of the Invention

The present invention relates generally to polyimides. In particular, it relates to polyimides containing siloxane groups, especially pendent siloxane groups.

2. Description of the Related Art

Polyimides (PI) comprise a large family of heterocyclic polymers which were first prepared in the late 1950s. Since then a large volume of information has been generated concerning the synthesis, characterization, use, physical and mechanical properties of these polymers. There are a number of reports concerning polyimides containing siloxane groups in the main-chain (i.e., polymer backbone). A patent describing polyimides containing siloxane groups in the backbone dates back to 1961, (D. L. Bailey and M. Pike, U.S. Pat. No. 2,998,406 to Union Carbide Corporation). These polymers were first described in the open literature in 1966, [V. H. Kuckertz, *Die Makromolekular Chemie*, 98, 101 (1966)], and they were prepared from 1,3-bis(3-aminophenyl)-1,1,3,3-tetramethyldisiloxane and pyromellitic dianhydride. Another paper involved the preparation of silicon containing dianhydrides and their subsequent reaction with aromatic diamines to form polyimides, [J. K. Gilliam and H. C. Gilliam, *Polymer Engineering and Science*, 13(6), 447 (1973)]. Other papers that followed include: I. Yilgor, E. Yilgor, B. C. Johnson, J. Eberle, G. L. Wilkes and J. E. McGrath, *Polymer Preprints*, 24(2), 78 (1983); S. Maudal and T. L. St. Clair, *International Journal of Adhesion and Adhesives*, 4(2), 87 (1984); B. C. Johnson, I. Yilgor and J. E. McGrath, *Polymer Preprints*, 25(2), 54 (1984); A. Berger, *Society for the Advancement of Material and Process Engineering Series*, 30, 64 (1985); and C. J. Lee, Ibid., 30,52 (1984).

Some United States patents that pertain to polyimides containing siloxane groups in the main chain include: F. F. Holub, U.S. Pat. No. 3,325,450 (1973); J. T. Hoback and F. F. Holub, U.S. Pat. No. 3,740,305 (1973); A. Berger, U.S. Pat. No. 4,011,279 (1977); H. Ryang, U.S. Pat. No. 4,404,350 (1983), all assigned to The General Electric Corporation; H. Sato, U.S. Pat. No. 4,395,426 (1982) to Hitachi Chemical Co. Ltd.; and A. Berger, U.S. Pat. No. 4,395,527 (1983) to M & T Chemicals, Inc. All of the above mentioned related art pertain to polyimides containing siloxanes in the polymer backbone.

SUMMARY OF THE INVENTION

A primary object of the present invention is to provide what is not available in the prior art, viz., novel polyimides containing pendent siloxane groups, which polyimides are resistant to atomic oxygen, have low dielectric constants and low moisture absorption characteristics along with unique separation characteristics, and which polyimides are useful as coatings, adhesives, films, membranes, moldings, and composite matrices.

According to the present invention, this primary object and other objects and benefits were achieved by providing novel polyimides containing pendent siloxane groups, which were prepared by the reaction of a hydroxy containing polyimide with either hydrogen terminated siloxane compounds or oligomers, or by the reaction of chloro terminated silicon compounds or oligomers. The resulting solutions were cast into thin films and the solvent subsequently removed by heating under vacuum. In some cases the films were translucent with the color varying from light tan to dark brown. The glass transition temperatures of the polyimides containing pendent siloxane groups ranged from 167° to 235° C. Thermogravimetric analysis showed a 5% weight loss occurring around 380° C. in both air and nitrogen. Thin film tensile properties determined at 23° C. gave tensile strengths and moduli from 8.2-15.6 ksi and 248-453 ksi, respectively.

DESCRIPTION OF THE PREFERRED EMBODIMENTS

Synthesis of the polyimides containing pendent siloxane groups (PISOX) involved the initial preparation of hydroxy containing polyimides (PIOH). The PIOH were prepared as depicted in equation 1 below from the reaction of a diaminobenzyhydrol compound and an aromatic dianhydride in at 23° C. to yield a poly(amide-acid). The poly(amide-acid) was added to a refluxing solution of 1:1 DMAc/xylenes to achieve cyclization to the PIOH. The polymers prepared in this way remain soluble whereas poly(amide-acid)s that were cast into thin films and thermally cyclized would not redissolve in DMAc, NMP or m-cresol.

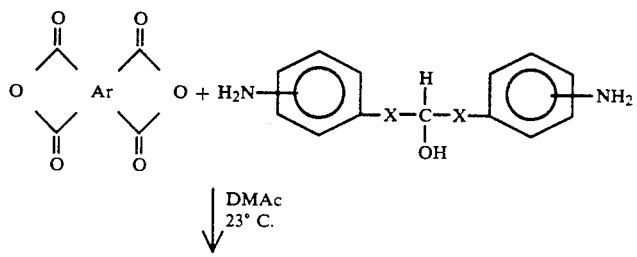

(Equation 1)

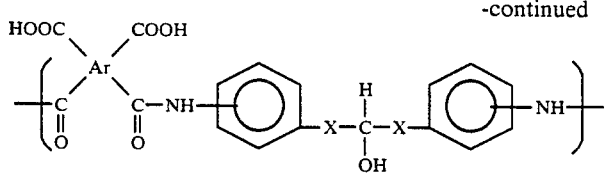

Poly(amide-acid)

↓ 1:1 DMAc/xylenes
reflux (~150° C.)

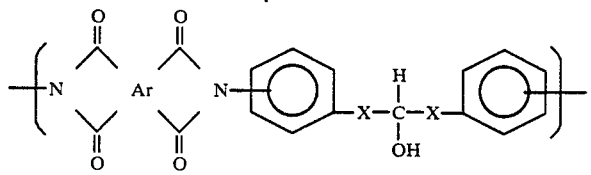

Polyimide Containing Hydroxy Groups (PIOH)

The PIOH must remain soluble in order to prepare the PISOX. The PISOX was prepared as shown in equation 2 from the PIOH and a hydrogen terminated siloxane compound or oligomer or a chloro terminated silicon compound or oligomer. A commercially available PIOH [Cemota Syntorg IP 605 or IP 608 (U.S. Pat. No. 3,609,123)] was also used to prepare PISOX as shown in equation 3.

(Equation 2)
(Equation 3)
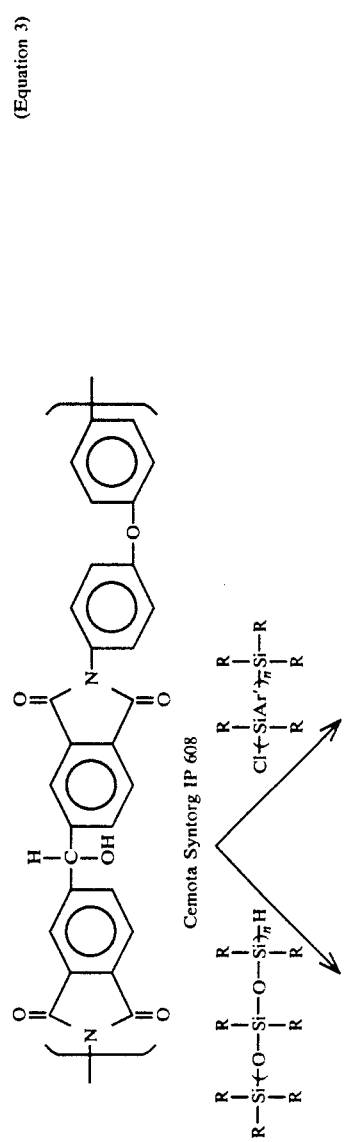

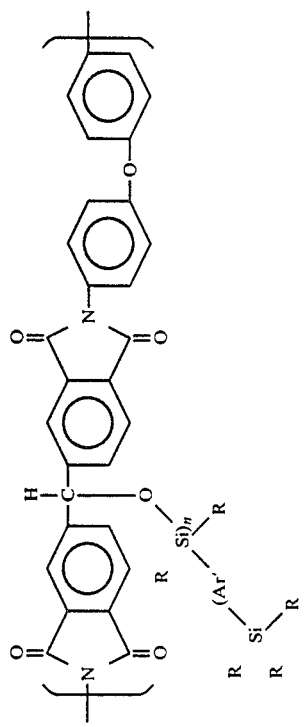
-continued
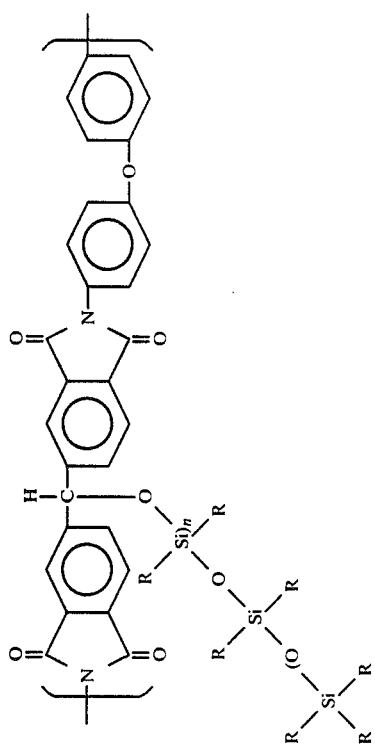

Random copolymers which contained various amounts of pendent siloxane groups and hydroxy groups were also prepared. These copolymers were synthesized as depicted in equations 4 and 5 by reacting less than 100% of the stoichiometric amount of the appropriate silicon or siloxane compound with the Cemota Syntorg IP 608 PIOH. The polymer solutions were cast into thin films, dried under vacuum and characterized.

(Equation 4)
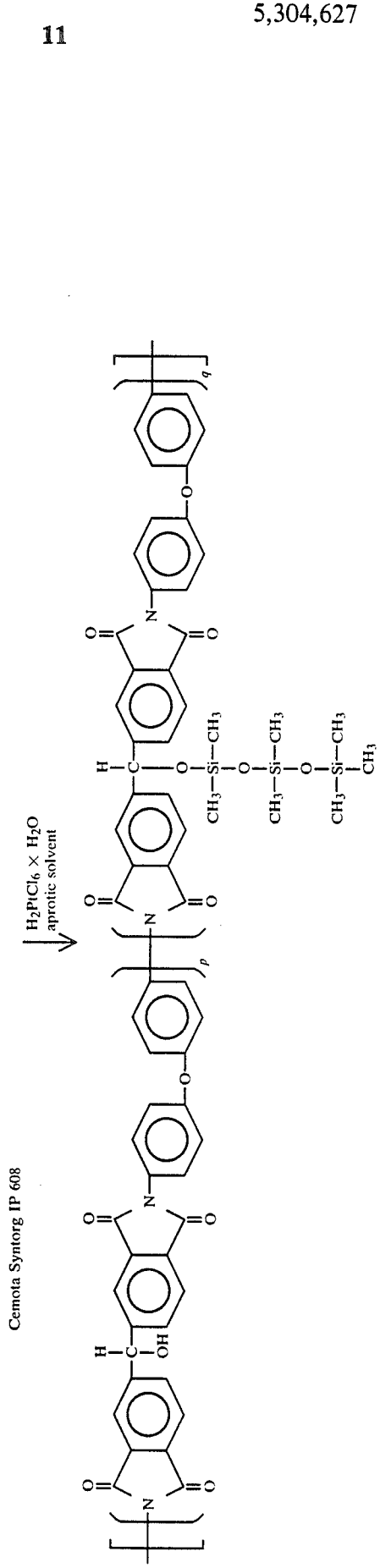
(Equation 5)
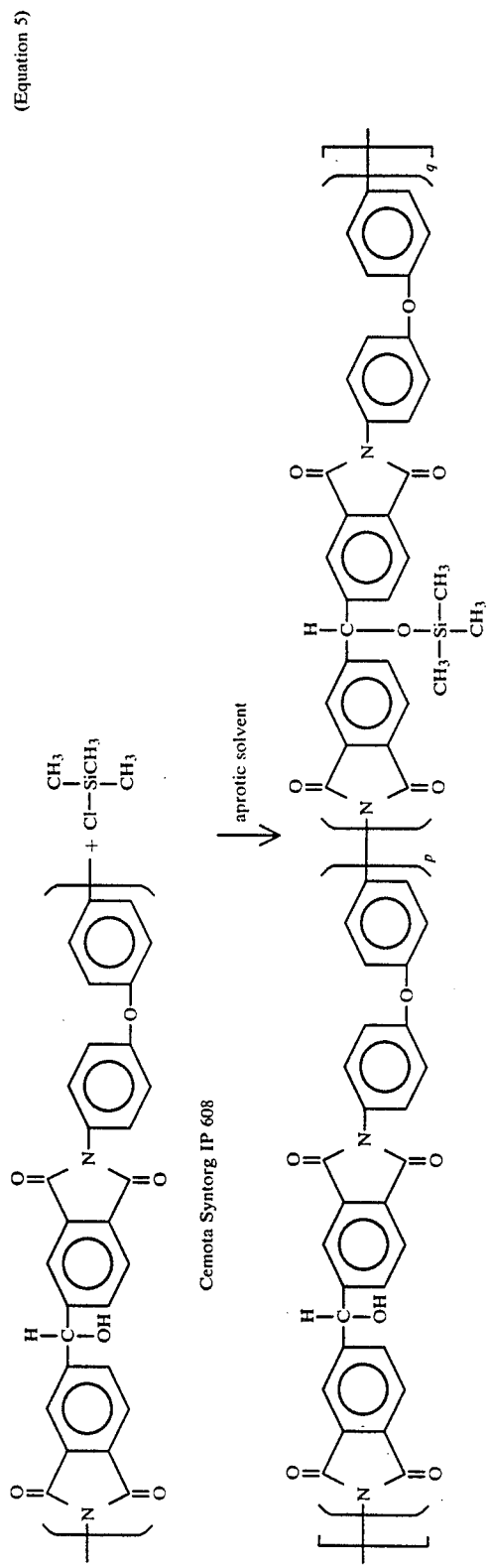
Where p = fraction (percentage) of hydroxy containing repeat unit and q = 1 − p fraction (percentage) of siloxane containing repeat unit.

In one aspect the invention is a polyimide containing siloxane groups and having repeating units selected from the group consisting of

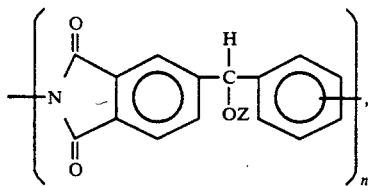
(A)

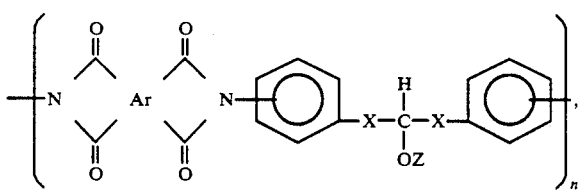
(B)

and

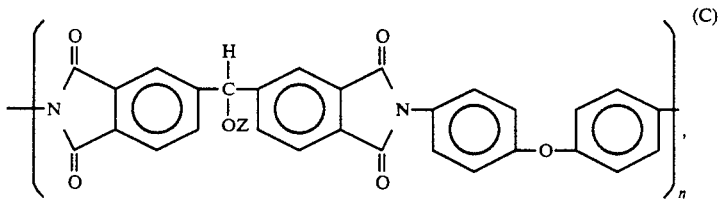
(C)

wherein the catenation of the nitrogen group is selected from the group consisting of: (A) meta and para, (B) meta-meta, para-para, and meta-para and (C) as shown; and wherein Ar is a radical selected from the group consisting of:

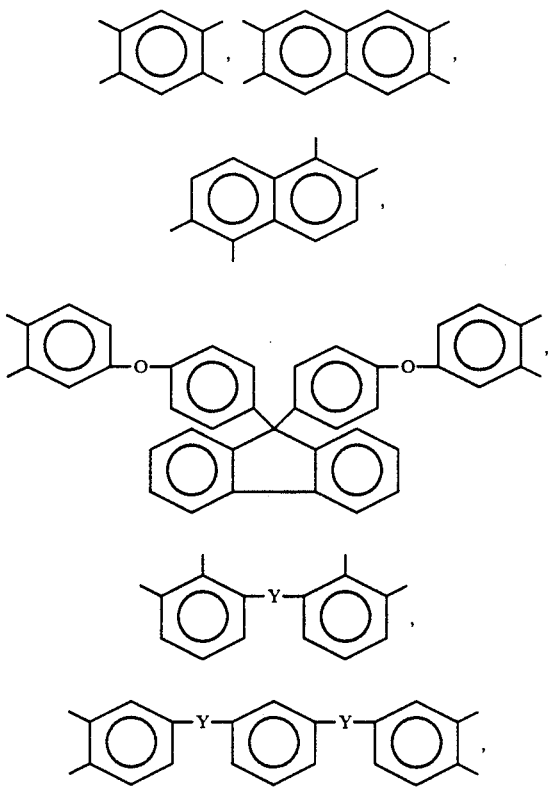

-continued

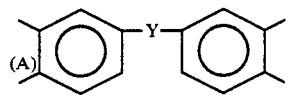

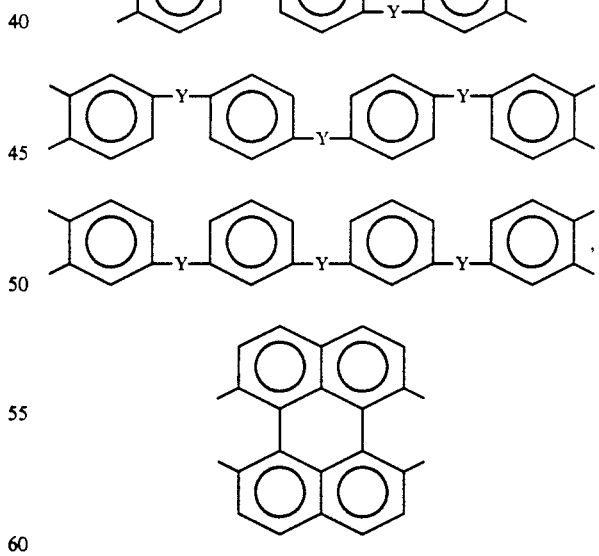

wherein Y is a bond or is a substituent selected from the group consisting of:

O, S, $SO_2$, $CH_2$, O=C, $C(CH_3)_2$, $C(CF_3)_2$, $Si(CH_3)_2$, $Si(CH_2CF_2CF_3)_3$;

wherein X is a bond or is a substituent selected from the group consisting of:

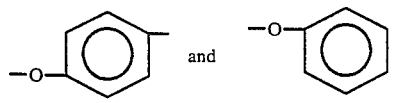 and
wherein Z is a substituent selected from the group of:
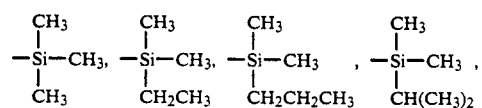
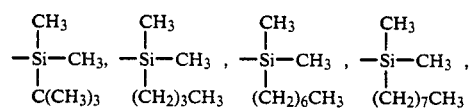
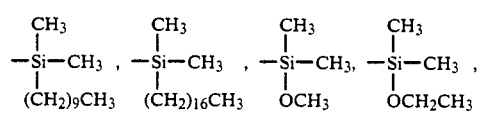
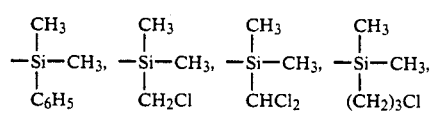
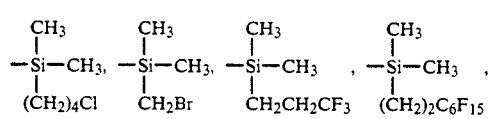
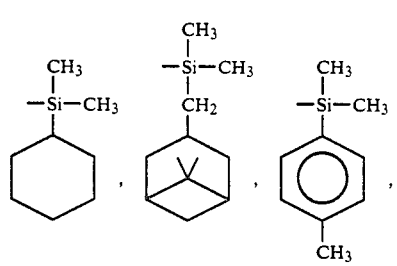
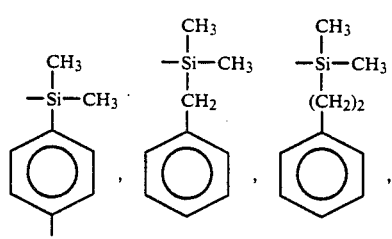
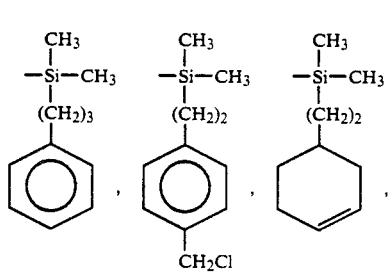
-continued
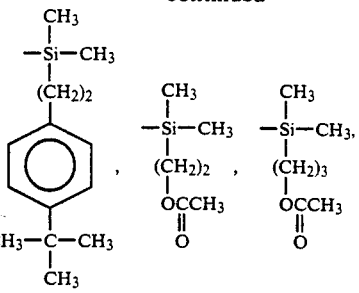
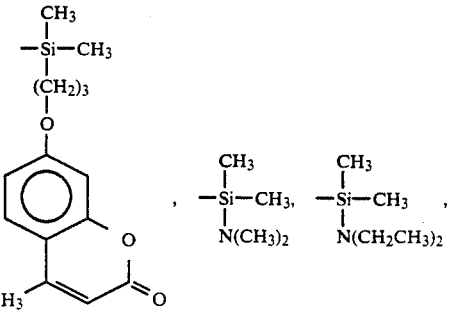
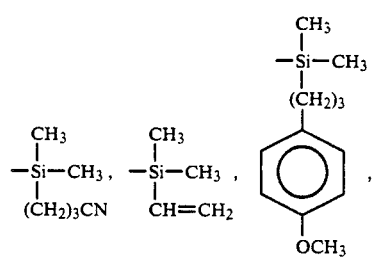
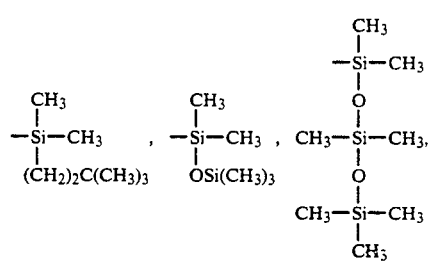
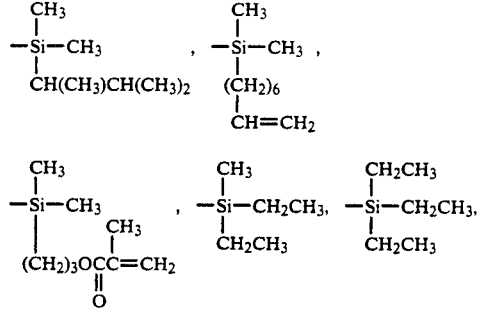
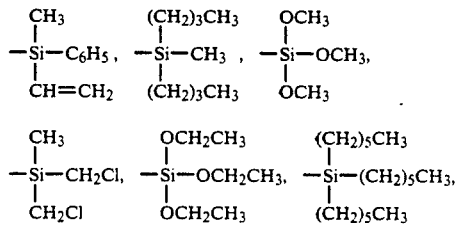

-continued

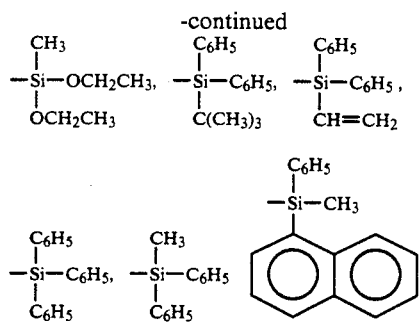

-continued

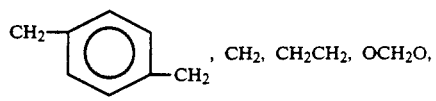, $CH_2$, $CH_2CH_2$, $OCH_2O$, $CF_2$, $CF_2CF_2$, $OCF_2O$;

wherein n is an integer between 1 and 1000; and wherein m is an integer between 1 and 1000.

In another aspect the invention is a copolyimide containing a random mixture of pendent hydroxy and siloxane groups and having repeating units selected from the group consisting of:

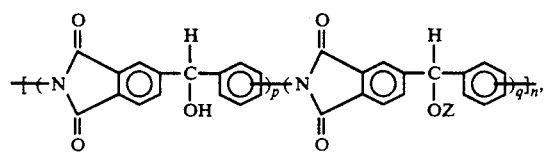 A)

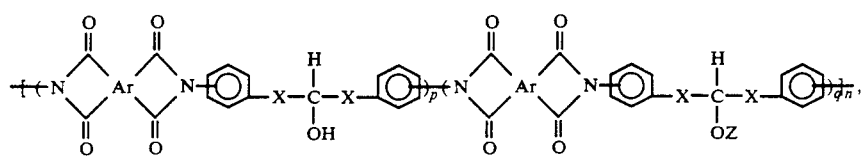 B)

and

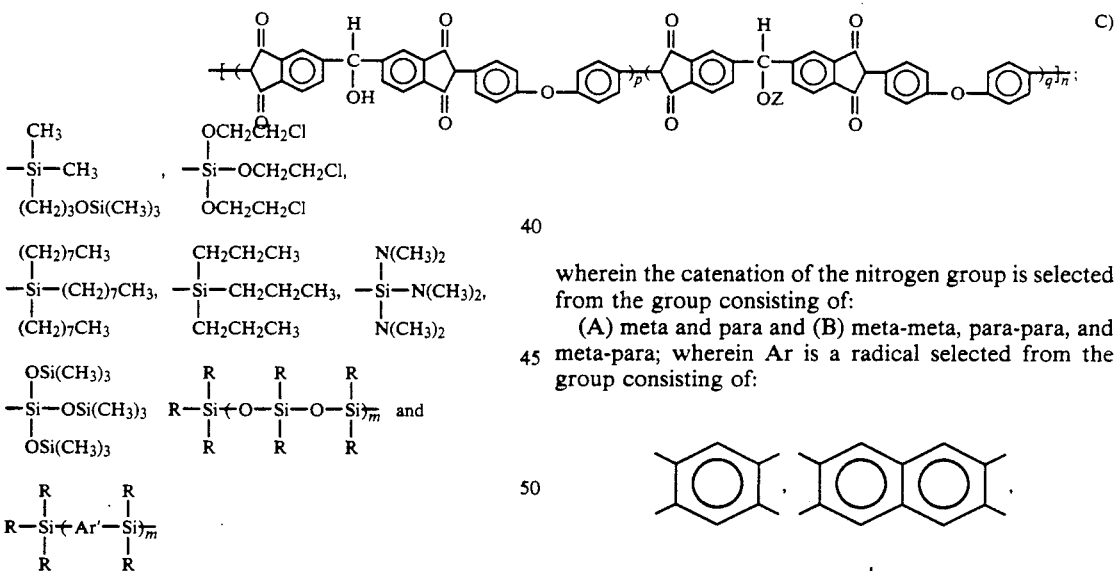 C)

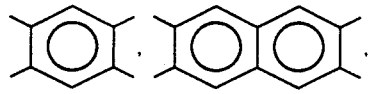

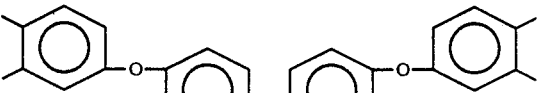

wherein the catenation of the nitrogen group is selected from the group consisting of:

(A) meta and para and (B) meta-meta, para-para, and meta-para; wherein Ar is a radical selected from the group consisting of:

wherein R is a substituent selected from the group consisting of:

$CH_3$, $CH_2CH_3$, $(CH_2)_2CH_3$, $CH(CH_3)_2$, $C_6H_5$, $(CH_2)_2CF_3$;

wherein Ar' is a substitute selected from the group consisting of:

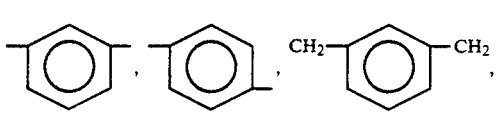

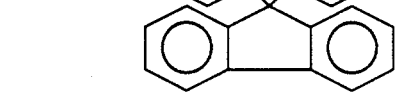

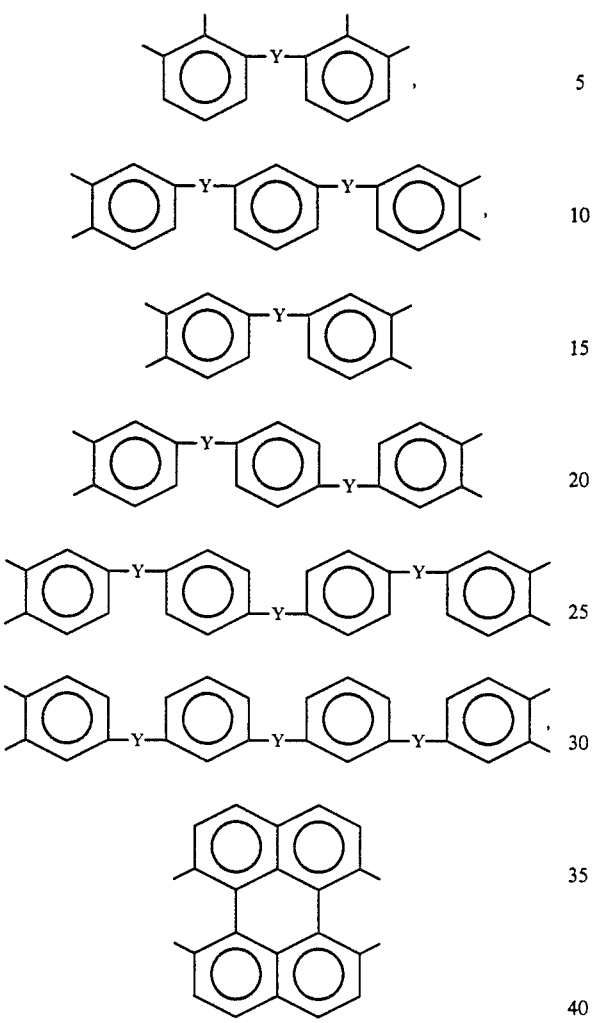
wherein Y is a bond or is a substituent selected from the group consisting of:
O, S, SO$_2$, CH$_2$, O=C, C(CH$_3$)$_2$, C(CF$_3$)$_2$, Si(CH$_3$)$_2$, Si(CH$_2$CF$_2$CF$_3$)$_2$;
wherein X is a bond or is a substituent selected from the group consisting of:
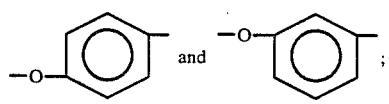
wherein Z is a substituent selected from the group consisting of:
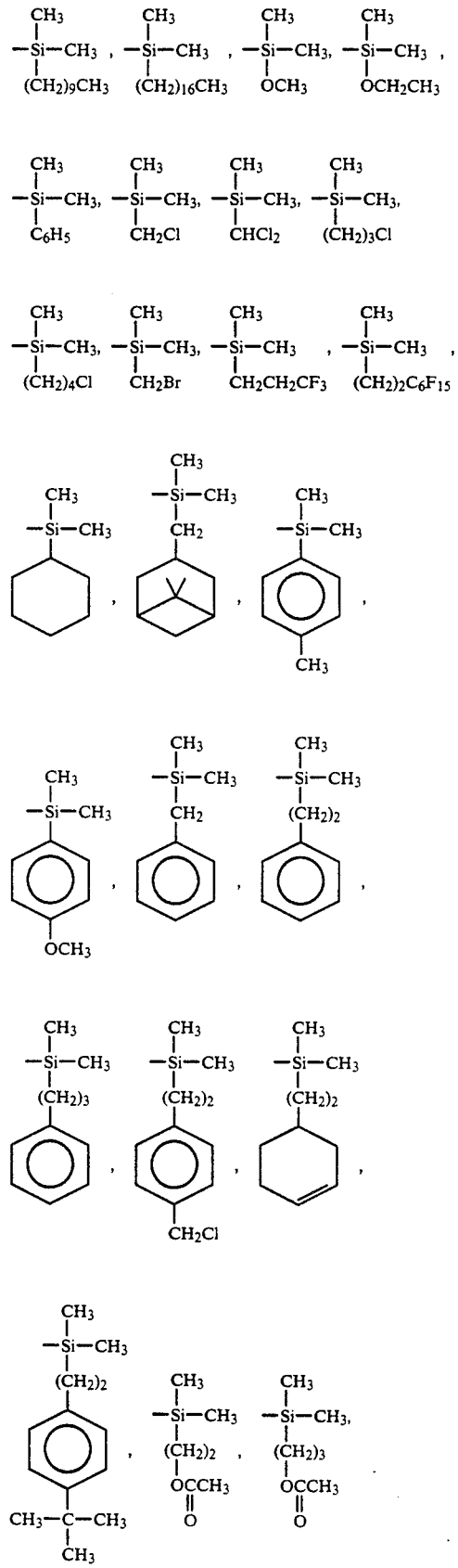

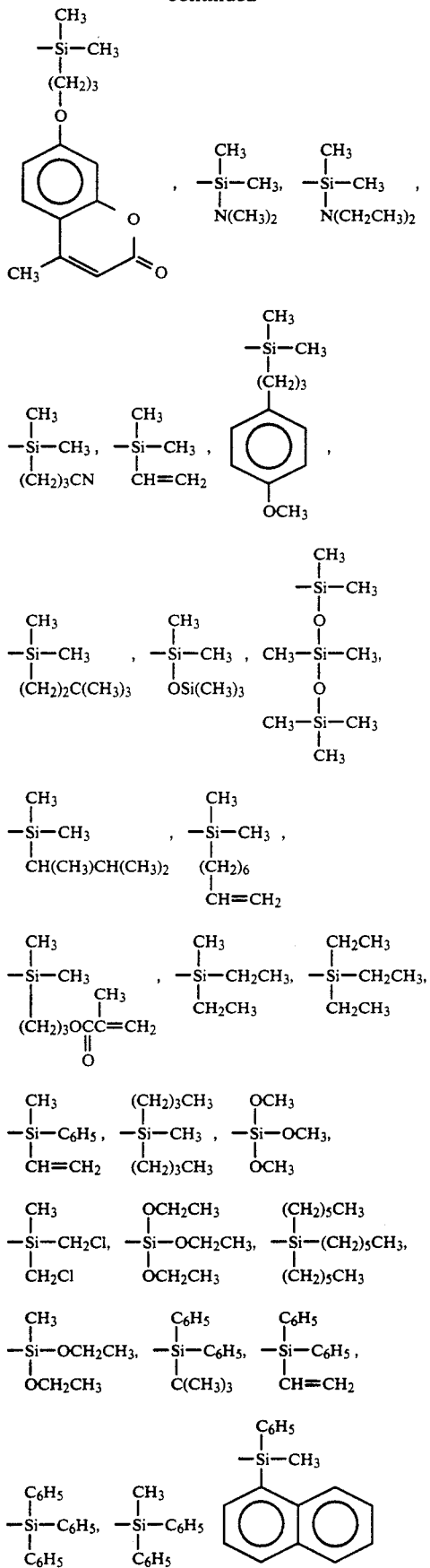

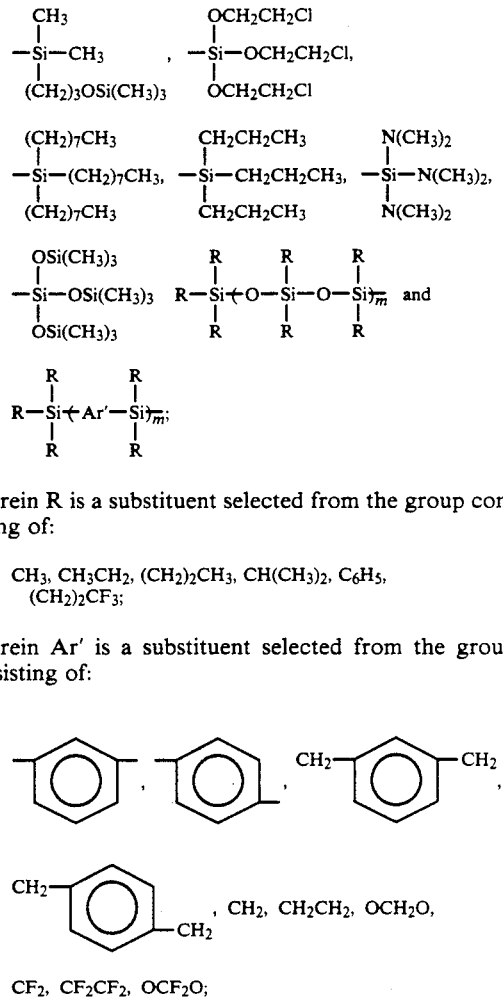

wherein R is a substituent selected from the group consisting of:

CH$_3$, CH$_3$CH$_2$, (CH$_2$)$_2$CH$_3$, CH(CH$_3$)$_2$, C$_6$H$_5$, (CH$_2$)$_2$CF$_3$;

wherein Ar' is a substituent selected from the group consisting of:

CF$_2$, CF$_2$CF$_2$, OCF$_2$O;

wherein p is a fraction (percentage) between 0.01 and 0.99;
wherein q is a fraction (percentage) equal to 1 minus p;
wherein n is an integer between 1 and 1000; and
wherein m is an integer between 1 and 1000.2

Having generally described the invention, a more complete understanding thereof can be obtained by reference to the following specific examples, which are provided herein for the purpose of illustration only and do not limit the invention.

EXAMPLE 1

The following example illustrates the reaction sequence for the synthesis of a polyimide containing pendent siloxane groups as depicted in equations 1 and 2 above where Ar was 3,3',4,4'-diphenyl ether, X was a bond, the diamine was meta,meta catenated, and the pendent group was 1,1,2,2,3,3,3-heptamethyltrisiloxane.

Synthesis of Polyimide Containing Hydroxy Groups (PIOH)

Into a 100 ml three neck round bottom flask equipped with a mechanical stirrer, nitrogen gas inlet and drying tube filled with calcium carbonate was placed 3,3'-diaminobenzhydrol (3.4067 g, 15.9 mmol) and DMAc (10.0 ml). The mixture was stirred at 23° C. until the diamine dissolved (about 15 minutes). To this solution was added 3,3',4,4'-diphenyl ether tetracarboxylic dianhydride (4.9323 g, 15.9 mmol) and DMAc (15.0 ml) to give a final concentration of 25.0% solids. The solution was stirred at 23° C. for about 16 hours under nitrogen to give a viscous poly(amide-acid) solution (inherent viscosity of a 0.5% solution in DMAc at 25° C. was 1.76 dL/g). The poly(amide-acid) solution was diluted to 15% solids by the addition of DMAc (14 ml) and transferred to a pressure equalizing addition funnel which had previously been flushed with nitrogen.

Into a 250 ml three neck round bottom flask equipped with a mechanical stirrer, thermometer, nitrogen gas inlet, Dean Stark trap and reflux condenser was placed DMAc (20 ml) and xylenes (30 ml). The liquids were heated to reflux (about 150° C.) and maintained for about five hours. The poly(amide-acid) solution was subsequently added dropwise to the refluxing DMAc/xylenes mixture over about a one hour period. Refluxing was continued for one hour after all of the poly(amide-acid) solution had been added. The xylenes were subsequently removed via the Dean Stark trap, and the polyimide was precipitated into water in a high speed blender. The polymer was washed repeatedly in water and dried at 150° C. for about four hours under vacuum. The polyimide had a glass transition temperature (Tg) of 252° C. and an inherent viscosity of 0.52 dL/g measured on a 0.5% solution in DMAc at 25° C.

Polyimide Containing Pendent Siloxane Groups (PISOX)

Into a 100 ml three neck round bottom flask equipped with a mechanical stirrer, nitrogen gas inlet and pressure equalizing addition funnel was placed the previously described PIOH (2.00 g, 4.1 mmol based on hydroxy group content, assuming a molecular weight of 20,000 g/mole) and DMAc (12 ml, 15% solids). The mixture was stirred at 23° C. until all of the PIOH dissolved (about one hour), and platinic acid (55 mg) was subsequently added. Into the pressure equalizing addition funnel was placed 1,1,2,2,3,3,3-heptamethyltrisiloxane (1.0 g, 4.5 mmol) and toluene (18 ml). The siloxane dissolved rapidly in the toluene, and the solution was subsequently added dropwise to the polymer solution over a 30 minute period. The solution was stirred at 23° C. for 16 hours, filtered through 5.0 micron filter paper under about 20 psi and cast into a thin film.

The film was stage-dried to 235° C. and held for one hour at 235° C. under vacuum. The slightly opaque film exhibited a Tg of 219° C. Infrared spectroscopic analysis of the film indicated that the reaction had proceeded as anticipated. Tensile strength and modulus of thin film specimens at 23° C. of 13.3 and 453 ksi, respectively were obtained.

EXAMPLE 2

The following example illustrates the reaction sequence for the synthesis of a polyimide containing pendent siloxane groups as depicted in equations 1 and 2 above where Ar was 3,3',4,4'-benzophenone, X was a bond, the diamine was meta,meta catenated, and the pendent group was 1,1,2,2,3,3,3-heptamethyltrisiloxane.

Synthesis of Polyimide Containing Hydroxy Groups (PIOH)

Into a three neck round bottom flask equipped with a mechanical stirrer, nitrogen gas inlet and drying tube filled with calcium carbonate was placed 3,3'-diaminobenzhydrol (3.3210 g, 15.5 mmol) and DMAc (15.0 ml). The mixture was stirred at 23° C. until the diamine dissolved (about 15 minutes). To this solution was added 3,3',4,4'-benzophenonetetracarboxylic dianhydride (4.9944 g, 15.5 mmol) and DMAc (10.0 ml) to give a final concentration of 25.0% solids. The solution was stirred at 23° C. for about 16 hours under nitrogen to give a viscous poly(amide-acid) solution (inherent viscosity of a 0.5% solution in DMAc at 25° C. was 0.81 dL/g). The poly(amide-acid) solution was diluted to 20% solids by the addition of DMAc (8 ml) and transferred to a pressure equalizing addition funnel which had previously been flushed with nitrogen.

Into a 250 ml three neck round bottom flask equipped with a mechanical stirrer, thermometer, nitrogen gas inlet, Dean Stark trap and reflux condenser was placed DMAc (20 ml) and xylenes (30 ml). The liquids were heated to reflux (about 150° C.) and maintained for about five hours. The poly(amide-acid) solution was subsequently added dropwise to the refluxing DMAc/xylenes mixture over about a one hour period. Refluxing was continued for one hour after all of the poly(amide-acid) solution had been added. The xylenes were subsequently removed via the Dean Stark trap, and the polyimide was precipitated into water in a high speed blender. The polymer was washed with water repeatedly and dried at 150° C. for about four hours under vacuum. The polyimide had a Tg of 267° C. and an inherent viscosity of 0.43 dL/g.

Polyimide Containing Pendent Siloxane Groups (PISOX)

Into a 100 ml three neck round bottom flask equipped with a mechanical stirrer, nitrogen gas inlet, and pressure equalizing addition funnel was placed the previously described PIOH (1.56 g, 3.1 mmol based on hydroxy group content, assuming a molecular weight of 20,000 g/mole) and DMAc (9 ml, 15% solids). The mixture was stirred at 23° C. until all of the PIOH dissolved (about one hour), and platinic acid (50 mg) was subsequently added. Into the pressure equalizing addition funnel was placed 1,1,2,2,3,3,3-heptamethyltrisiloxane (0.73 g, 3.25 mmol) and toluene (5 ml). The siloxane solution was added dropwise to the PIOH solution over a 30 minute period. The solution was stirred at 23° C. under nitrogen for 16 hours and subsequently filtered through a 5.0 micron filter under pressure (about 20 psi) and cast into a thin film on plate glass. The film was stage-dried to 220° C. and held at 220° C. for one hour under vacuum. The translucent orange film exhibited a Tg of 235° C. Tensile strength and modulus of thin film specimens at 23° C. of 12.5 and 391 ksi, respectively were obtained.

EXAMPLE 3

The following example illustrates the reaction sequence for the synthesis of a polyimide containing pendent siloxane groups from the Cemota Syntorg IP 608 PIOH as depicted in equation 3 where the pendent group was 1,1,2,2,3,3,3-heptamethyltrisiloxane.

Synthesis of Polyimide Containing Pendent Siloxane Groups (PISOX)

Into a 100 ml three neck round bottom flask equipped with a mechanical stirrer, nitrogen gas inlet, and pressure equalizing addition funnel was placed Cemota Syntorg IP 608 PIOH (10.12 g, 40.2 mmol based on hydroxy group content, assuming a molecular weight of 36,000 g/mole) and NMP (58 ml, 15% solids). The mixture was stirred at 23° C. under nitrogen until all of the polymer had dissolved (about one hour) and platinic acid (105 mg) was subsequently added. Into the pressure equalizing addition funnel was placed 1,1,2,2,3,3,3-heptamethyltrisiloxane (9.86 g, 44.3 mmol) and toluene (25 ml). The siloxane solution was added to the PIOH solution dropwise over a one hour period. The solution was stirred at 23° C. under nitrogen for 16 hours and subsequently filtered through a 5.0 micron filter under pressure (about 20 psi). A thin film was cast from the solution onto plate glass. The film was dried to a tack-free state in a dust-proof chamber and stage-dried to 225° C. and held at 225° C. for one hour under vacuum. The translucent yellow/green film exhibited a Tg of 167° C. Tensile strength and modulus of thin film speciments at 23° C. of 11 and 250 ksi, respectively were obtained.

EXAMPLE 4

The following example illustrates the reaction sequence for the synthesis of the polyimide containing pendent siloxane groups from the Cemota Syntorg IP 608 PIOH as depicted in equation 3 above where the pendent group was trimethyl silyl.

Polyimide Containing Pendent Siloxane Groups (PISOX)

Into a 100 ml three neck round bottom flask equipped with a mechanical stirrer, nitrogen gas inlet and pressure equalizing addition funnel was placed Cemota Syntorg IP 608 PIOH (5.3 g, 21.1 mmol based on hydroxy group content, assuming a molecular weight of 36,000 g/mole) and DMAc (31 ml, 15% solids). The mixture was stirred at 23° C. under nitrogen until all of the polymer dissolved (about one hour). Into the pressure equalizing addition funnel was placed the chlorotrimethylsilane (2.65 g, 24.3 mmol) and toluene (10 ml). The toluene/silane solution was added dropwise to the PIOH solution over a 30 minute period. The solution was stirred at 23° C. for about 16 hours and subsequently filtered through a 5.0 micron filter under pressure (about 20 psi). The solution was used to cast a thin film on plate glass which was air dried to a tack-free state. The film was stage-dried to 240° C. and held at 240° C. for one hour under vacuum. The clear orange film exhibited a Tg of 210° C. by differential scanning calorimetry. Tensile strength and modulus of thin film specimens at 23° C. of 16.9 and 404 ksi, respectively were obtained.

Polymer characterization is presented in the following Tables 1 and 2, and thin film properties are presented in Tables 3 and 4.

TABLE 1
POLYMER CHARACTERIZATION

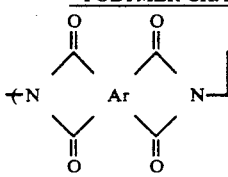

| Ar | Glass Transition Temperature, °C. | Film Appearance, Quality |
| --- | --- | --- |
| 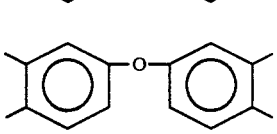 | 235 | orange, translucent, tough, creasable |
| 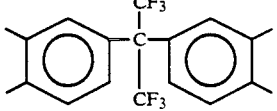 | 219 | brown, translucent, tough, creasable |
| 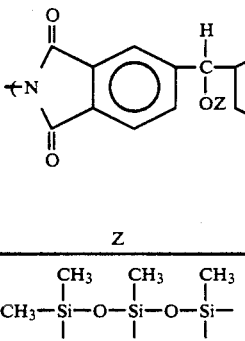 | 211 | light tan, translucent, tough, creasable |

TABLE 2
POLYMER CHARACTERIZATION

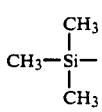

| Z | Glass Transition Temperature, °C. | Film Appearance, Quality |
| --- | --- | --- |
| CH₃—Si(CH₃)—O—Si(CH₃)—O—Si(CH₃)—CH₃ (with CH₃ groups) | 167 | yellow/green, semi-translucent, tough, creasable |
| CH₃—Si(CH₃)—CH₃ | 210 | orange, clear, tough, creasable |
| H (Cemota Syntorg | 250 | orange, clear, |

TABLE 2-continued
POLYMER CHARACTERIZATION

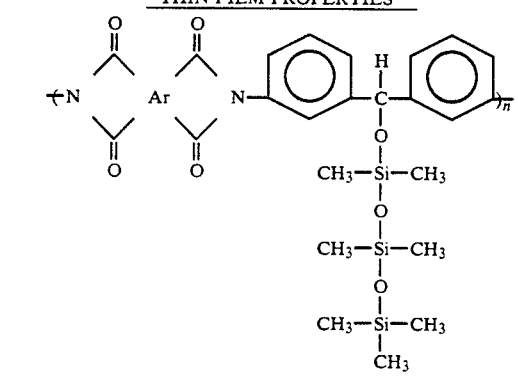

| Z | Glass Transition Temperature, °C. | Film Appearance, Quality |
|---|---|---|
| IP 608 Polyimide) | | tough, creasable |

TABLE 3
THIN FILM PROPERTIES*

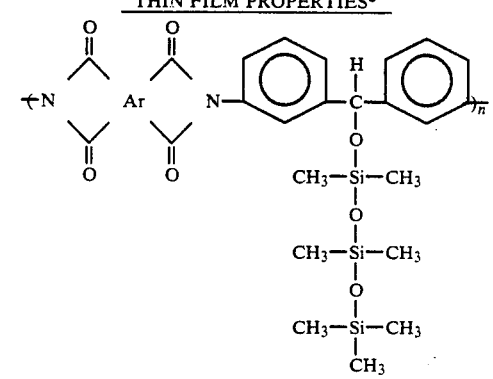

| Ar | Tensile Strength, ksi | Tensile Modulus, ksi | Elong., % |
|---|---|---|---|
| (benzophenone) | 12.5 | 390.6 | 9.4 |
| (diphenyl ether) | 13.3 | 453.3 | 4.1 |

TABLE 3-continued
THIN FILM PROPERTIES*

| Ar | Tensile Strength, ksi | Tensile Modulus, ksi | Elong., % |
|---|---|---|---|
| (hexafluoroisopropylidene diphenyl) | 8.2 | 360.6 | 12.0 |

*Tensile properties determined at 23° C.

TABLE 4
THIN FILM PROPERTIES*

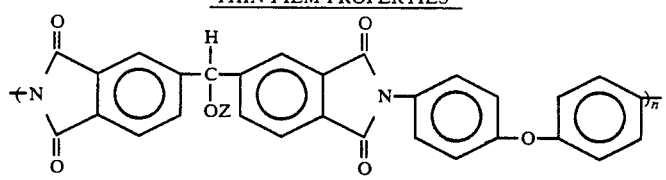

| Z | Tensile Strength, ksi | Tensile Modulus, ksi | Elong., % | Dielectric Constant |
|---|---|---|---|---|
| $CH_3-Si(CH_3)_2-$ | 16.9 | 404.1 | 28.8 | — |
| $CH_3-Si(CH_3)_2-O-Si(CH_3)_2-O-Si(CH_3)_2-$ | 10.9 | 250.0 | 34.3 | 2.8 |
| H (Cemota Syntorg IP 608 Polyimide) | 18.1 | 442.3 | 10.4 | 3.4 |

*Tensile properties determined at 23° C.

EXAMPLE 5

The following example illustrates the reaction sequence for the synthesis of a random copolyimide containing pendent siloxane groups from the Cemota Syntorg IP 608 PIOH as depicted in equation 4 above where the pendent group was 1,1,2,2,3,3,3-heptamethyltrisiloxane, p=0.75 and q=0.25.

Copolyimide Containing Pendent Siloxane Groups

Into a 100 ml three neck round bottom flask equipped with a mechanical stirrer, nitrogen gas inlet, pressure equalizing addition funnel and drying tube filled with calcium carbonate was placed Cemota Syntorg IP 608 PIOH solution (25.5% solids in NMP) (8.79 g solution=2.24 g polymer, 8.9 mmol based on hydroxy group content, assuming a molecular weight of 36,000 g/mol) and DMAc (6 ml, 15% solids). The mixture was stirred at 23° C. until all of the polymer had dissolved (about one hour), and platinic acid (45 mg) was subsequently added. Into the pressure equalizing addition funnel was placed 1,1,2,2,3,3,3-heptamethyltrisiloxane (0.50 g, 2.2 mmol, 25% of theoretical hydroxy content) and toluene (3 ml). The siloxane solution was added dropwise over a 10 minute period. The solution was stirred at room temperature under nitrogen for about 16 hours. The solution was centrifuged and a thin film was cast onto plate glass. The film was dried to a tack-free state in a dust-free chamber and subsequently stage-dried to 225° C. and held at 225° C. for one hour under vacuum. The translucent dark yellow/green film exhibited a Tg of 231° C. by differential scanning calorimetry. Tensile strength, modulus and elongation of thin film specimens at 23° C. of 15.6, 378.9 ksi and 21.0%, respectively were obtained.

EXAMPLE 6

The following example illustrates the reaction sequence for the synthesis of a copolyimide containing pendent siloxane groups from the Cemota Syntorg IP 608 PIOH as depicted in equation 4 above where the pendent group was 1,1,2,2,3,3,3-heptamethyltrisiloxane, p=0.50 and q=0.50.

Synthesis of Copolyimide Containing Pendent Siloxane Groups

Into a 100 ml three neck round bottom flask equipped with a mechanical stirrer, nitrogen gas inlet, pressure equalizing addition funnel and drying tube filled with calcium carbonate was placed Cemota Syntorg IP 608 PIOH solution (25.5% solids in NMP) (9.41 g solution=2.40 g polymer, 9.55 mmol based on hydroxyl group content, assuming a molecular weight of 36,000 g/mol) and DMAc (7 ml, 15% solids). The mixture was stirred at 23° C. until all of the polymer dissolved (about one hour), and platinic acid (60 mg) was subsequently added. Into the pressure equalizing addition funnel was placed 1,1,2,2,3,3,3-heptamethyltrisiloxane (1.06 g, 4.77 mmol, 50% of theoretical hydroxy content) and toluene (5 ml). The siloxane solution was added dropwise to the PIOH solution over a 10 minute period. The solution was stirred at 23° C. under nitrogen for about 16 hours. The solution was centrifuged, and a thin film was cast onto plate glass. The film was dried to a tack-free state in a dust-proof chamber and subsequently stage-dried to 225° C. and held at 225° C. for one hour under vacuum. The translucent dark yellow/green film exhibited a Tg of 216° C. by differential scanning calorimetry. Tensile strength, modulus and elongation of thin film specimens at 23° C. of 13.3, 330.9 and 25.1%, respectively were obtained.

EXAMPLE 7

The following example illustrates the synthesis of a copolyimide containing pendent siloxane groups from the Cemota Syntorg IP 608 PIOH as depicted in equation 4 above where the pendent siloxane group was 1,1,2,2,3,3,3-heptamethyltrisiloxane, p=0.25 and q=0.75.

Synthesis of Copolyimide Containing Pendent Siloxane Groups

Into a 100 ml three neck round bottom flask equipped with a mechanical stirrer, nitrogen gas inlet, pressure equalizing addition funnel and drying tube filled with calcium carbonate was placed Cemota Syntorg IP 608 PIOH solution (9.61 g solution=2.45 g polymer, 9.75 mmol based on hydroxy group content, assuming a molecular weight of 36,000 g/mol) and DMAc (7 ml, 15% solids). The mixture was stirred at 23° C. until all of the polymer had dissolved (about one hour), and platinic acid (75 mg) was subsequently added. Into the pressure equalizing addition funnel was placed 1,1,2,2,3,3,3-heptamethyltrisiloxane (1.63 g, 7.31 mmol, 75% of theoretical hydroxy group content) and toluene (5 ml). The siloxane was added dropwise to the PIOH solution over a 10 minute period. The solution was stirred at 23° C. under nitrogen for about 16 hours. The solution was centrifuged, and a thin film was cast onto plate glass. The film was dried to a tack free state in a dust-proof chamber and subsequently stage-dried to 225° C. and held at 225° C. for one hour under vacuum. The translucent yellow/orange film exhibited a Tg of 186° C. by differential scanning calorimetry. Tensile strength, modulus and elongation of thin film specimens at 23° C. of 11.5, 281.3 and 34.3%, respectively were obtained.

EXAMPLE 8

The following example illustrates the reaction sequence for the synthesis of a random copolyimide containing pendent siloxane groups from the Cemota Syntorg IP 608 PIOH as depicted in equation 5 above where the pendent group was trimethylsilyl, p=0.75 and q=0.25.

Copolyimide Containing Pendent Siloxane Groups

Into a 100 ml three neck round bottom flask equipped with a mechanical stirrer, nitrogen gas inlet, pressure equalizing addition funnel and drying tube filled with calcium carbonate was placed Cemota Syntorg IP 608 PIOH solution (25.5% solids in NMP) (8.46 g solution=2.16 g polymer, 8.6 mmol based on hydroxy group content, assuming a molecular weight of 36,000 g/mol) and DMAc (7 ml, 15% solids). The mixture was stirred at 23° C. until it was homogeneous (about one hour). Into the pressure equalizing addition funnel was placed chlorotrimethylsilane (0.23 g, 2.5 mmol, 25% of theoretical hydroxy content) and toluene (5 ml). The toluene solution was added dropwise to the PIOH solution over a 10 minute period and the solution was stirred at 23° C. under nitrogen for about 16 hours. The solution was centrifuged, and a thin film was cast onto plate glass. The film was dried to a tack free state in a dust-free chamber and subsequently stage-dried to 235° C. and held at 235° C. for one hour under vacuum. The transparent orange film exhibited a Tg of 235° C. Tensile strength, modulus and elongation of thin film specimens at 23° C. of 19.0, 498.7 ksi and 9.9%, respectively were obtained.

EXAMPLE 9

The following example illustrates the reaction sequence for the synthesis of a random copolyimide containing pendent siloxane groups from the Cemota Syntorg IP 608 PIOH as depicted in equation 5 above where the pendent siloxane group was trimethylsilyl, p=0.50 and q=0.50.

Synthesis of Copolyimide Containing Pendent Siloxane Groups

Into a 100 ml three neck round bottom flask equipped with a mechanical stirrer, nitrogen gas inlet, pressure equalizing addition funnel and drying tube filled with calcium carbonate was placed Cemota Syntorg IP 608 PIOH solution (25.5% solids in NMP) (8.52 g solution=2.13 g polymer, 8.47 mmol based on hydroxy group content, assuming a molecular weight of 36,000 g/mol) and DMAc (6 ml, 15% solids). The mixture was stirred at 23° C. until it was homogeneous (about one hour). Into the addition funnel was placed the chlorotrimethylsilane (0.46 g, 4.24 mmol, 50% of theoretical hydroxy content) and toluene (5 ml). The toluene solution was added dropwise to the PIOH solution over a 10 minute period and the solution was stirred at 23° C. under nitrogen for about 16 hours. The solution was centrifuged, and a thin film cast onto plate glass. The film was dried to a tack-free state in a dust-proof chamber and subsequently stage-dried to 240° C. and held at 240° C. for one hour under vacuum. The transparent orange film exhibited a Tg of 225° C. Tensile strength, modulus and elongation at 23° C. of 21.3, 538 ksi and 11.8%, respectively were obtained.

EXAMPLE 10

The following example illustrates the reaction sequence for the synthesis of a random copolyimide containing pendent siloxane groups from the Cemota Syntorg IP 608 PIOH as depicted in equation 5 above where the pendent siloxane group was trimethylsilyl, p=0.25 and q=0.75.

Synthesis of Copolyimide Containing Pendent Siloxane Groups

Into a 100 ml three neck round bottom flask equipped with a mechanical stirrer, nitrogen gas inlet, pressure equalizing addition funnel and drying tube filled with calcium carbonate was placed Cemota Syntorg IP 608 PIOH solution (25.5% solids in NMP) (7.53 g solution=1.92 g polymer, 7.64 mmol based on hydroxy group content, assuming a molecular weight of 36,000 g/mol) and DMAc (6 ml, 15% solids). The mixture was stirred until it became homogeneous (about one hour). Into the addition funnel was placed chlorotrimethylsilane (0.62 g, 5.73 mmol, 75% of theoretical hydroxy content) and toluene (5 ml). The toluene solution was added dropwise to the PIOH solution over a 10 minute period, and the solution was stirred at 23° C. under nitrogen for about 16 hours. The solution was centrifuged, and a thin film was cast onto plate glass. The film was dried to a tack-free state in a dust-proof chamber and subsequently stage-dried to 240° C. and held at 240° C. for one hour under vacuum. The transparent orange film exhibited a Tg of 215° C. Tensile strength, modulus and elongation of thin film specimens at 23° C. of 18.7, 482.9 ksi and 15.6% were obtained.

The chemical structures of the commercially available polyimides containing benzhydrol groups are shown below.

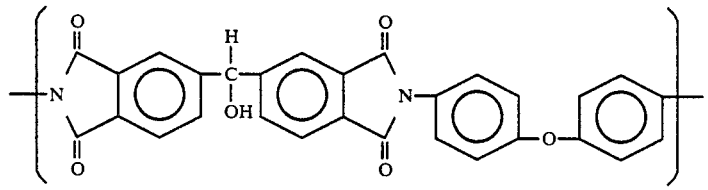

Cemota Syntorg IP 608

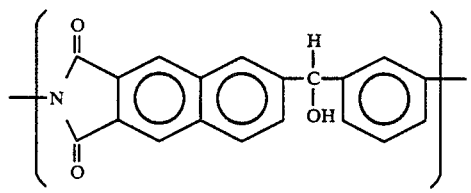

Cemota Syntorg IP 605

Polymer characterization is presented in Tables 1 and 2 above. Thin film properties are presented in Tables 3 and 4 above, and copolymer characterization is presented in Tables 5 and 6 below.

TABLE 5
COPOLYMER CHARACTERIZATION

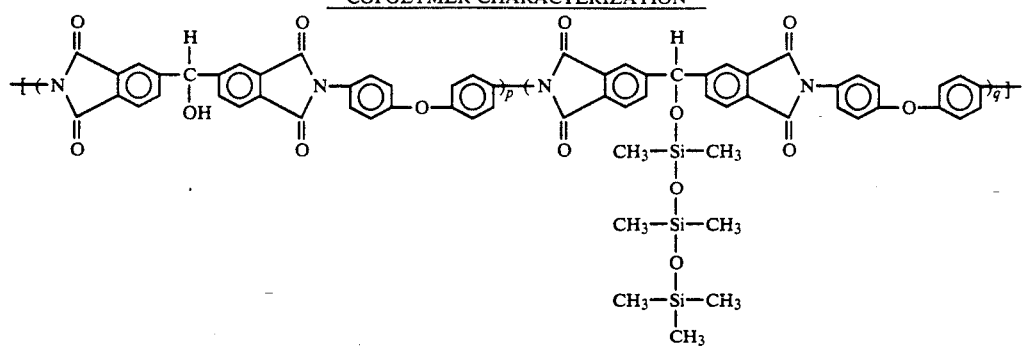

Random copolymer

| p | q | Tg, °C. | Tensile* Strength, ksi | Tensile* Modulus, ksi | Elong., % | Dielectric** Constant |
|---|---|---|---|---|---|---|
| 75% | 25% | 231 | 15.6 | 378.9 | 21.0 | 3.1 |
| 50% | 50% | 216 | 13.3 | 330.9 | 25.1 | 3.0 |
| 25% | 75% | 186 | 11.5 | 281.3 | 34.3 | 2.9 |

*Thin film tensile properties determined at 23° C.
**Dielectric Constant determined at 23° C.

TABLE 6
COPOLYMER CHARACTERIZATION

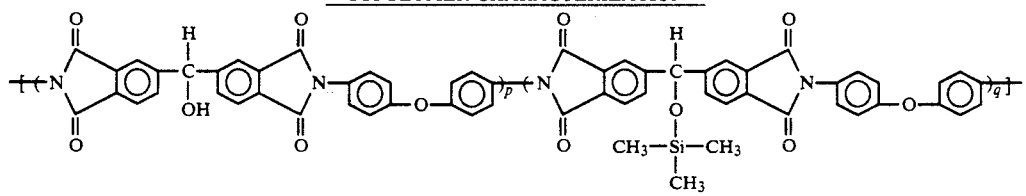

Random copolymer

| p | q | Tg, °C. | Tensile* Strength, ksi | Tensile* Modulus, ksi | Elong., % |
|---|---|---|---|---|---|
| 75% | 25% | 235 | 19.0 | 498.7 | 9.9 |
| 50% | 50% | 225 | 21.3 | 538.0 | 11.8 |
| 25% | 75% | 215 | 18.7 | 482.9 | 15.6 |

Thin film tensile properties determined at 23° C.

We claim:
1. A polyimide containing siloxane groups and having repeating units selected from the group consisting of

(A) 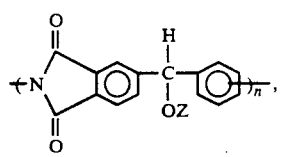

(B)

(C)

wherein the catenation of the nitrogen group is selected from the group consisting of: (A) meta and para, (B) meta-meta, para-para, and meta-para and (C) as shown; and wherein Ar is a radical selected from the group consisting of:

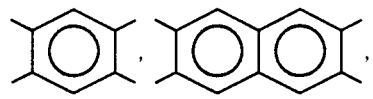

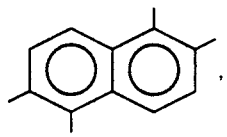

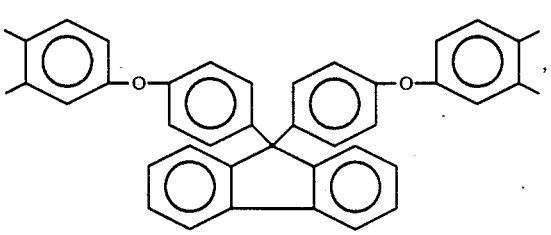

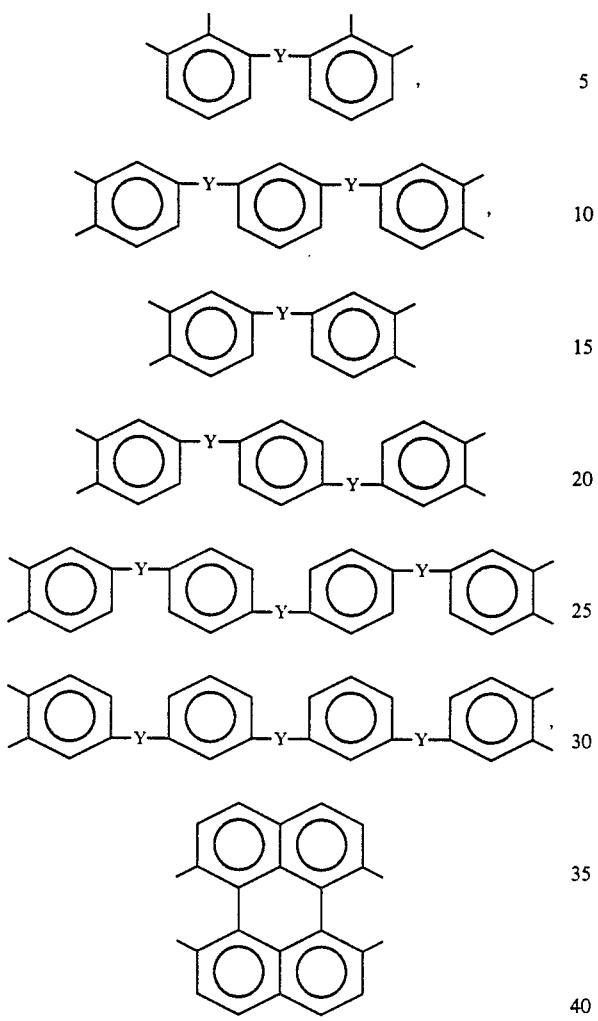
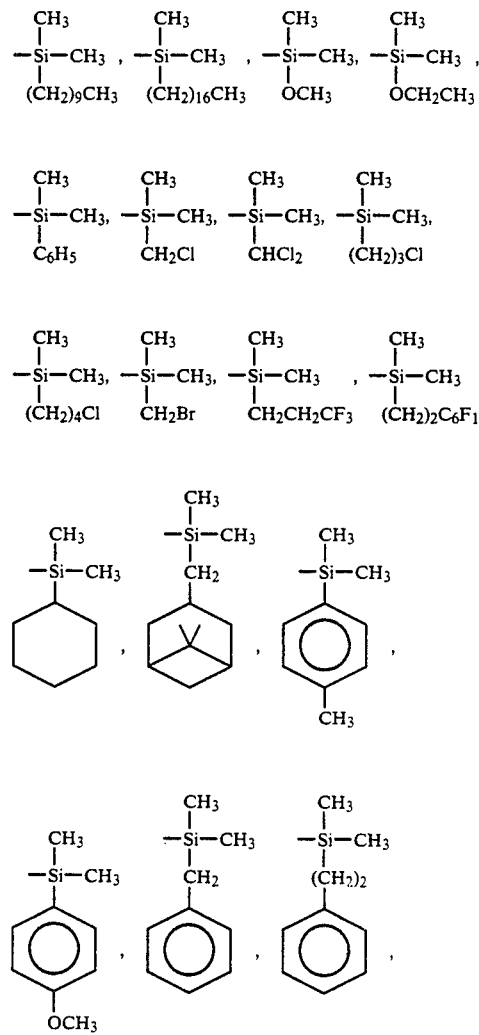
wherein Y is a band or is a substituent selected from the group consisting of:
O, S, SO$_2$, CH$_2$, O=C, C(CH$_3$)$_2$, C(CF$_3$)$_2$, Si(CH$_3$)$_2$, Si(CH$_2$CF$_2$CF$_3$)$_2$;
wherein X is a bond or is a substituent selected from the group consisting of:
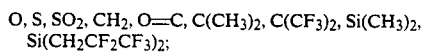
wherein Z is a substituent selected from the group consisting of:
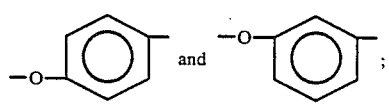
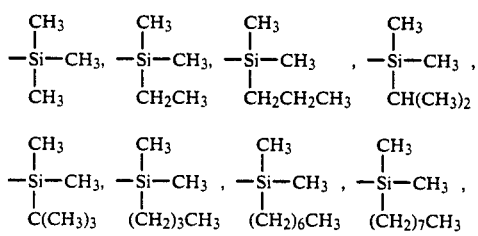
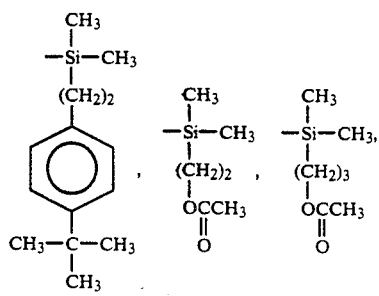

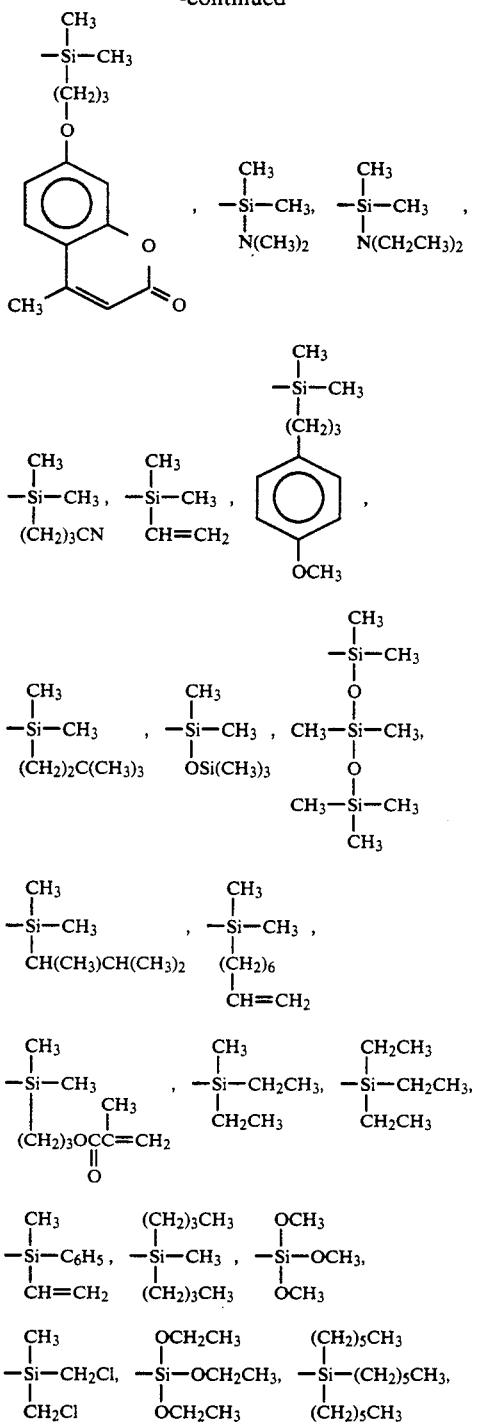

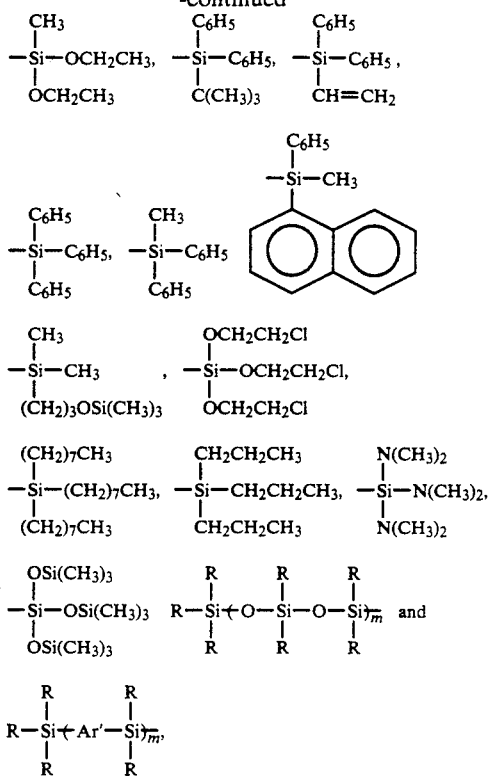

wherein R is a substituent selected from the group consisting of:

$CH_3$, $CH_2CH_3$, $(CH_2)_2CH_3$, $CH(CH_3)_2$, $C_6H_5$, $(CH_2)_2CF_3$;

wherein Ar' is a substitute selected from the group consisting of:

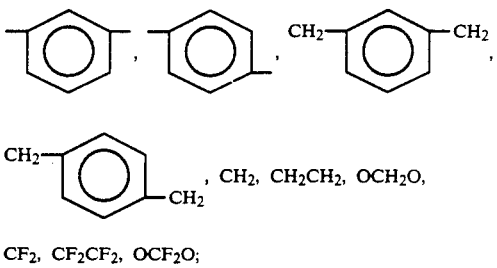

$CF_2$, $CF_2CF_2$, $OCF_2O$;

wherein n is an integer between 1 and 1000; and wherein m is an integer between 1 and 1000.

2. A copolyimide containing a random mixture of pendent hydroxy and siloxane groups and having repeating units selected from the group consisting of:

A)

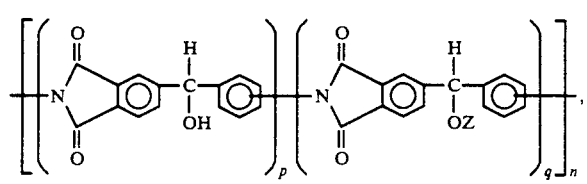

-continued

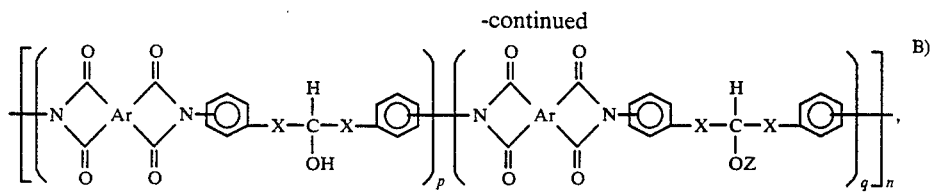  B)

and

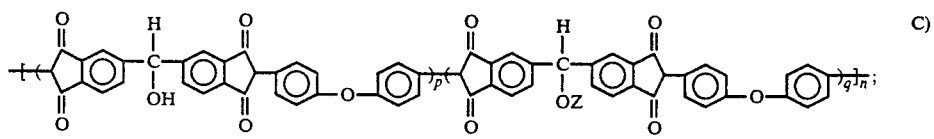  C)

wherein the catenation of the nitrogen group is selected from the group consisting of:
(A) meta and para and (B) meta-meta, para-para, and meta-para; wherein Ar is a radical selected from the group consisting of:

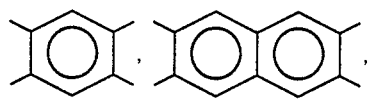

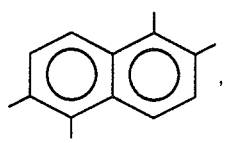

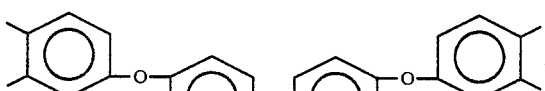

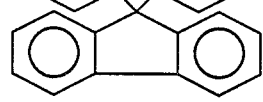

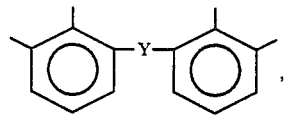

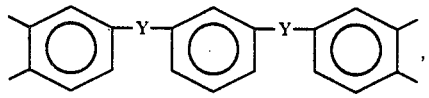

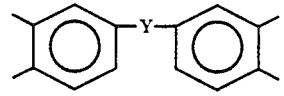

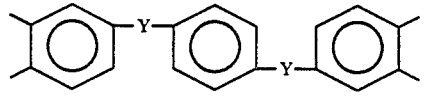

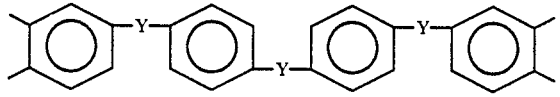

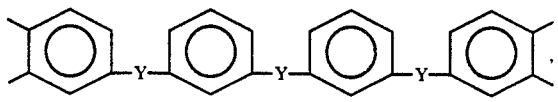

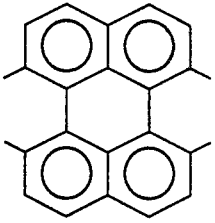

wherein Y is a bond or is a substituent selected from the group consisting of:

O, S, SO$_2$, CH$_2$, O=C, C(CH$_3$)$_2$, C(CF$_3$)$_2$, Si(CH$_3$)$_2$, Si(CH$_2$CF$_2$CF$_3$)$_2$;

wherein X is a bond or is a substituent selected from the group consisting of:

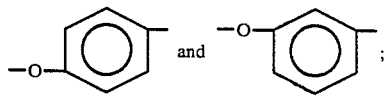

wherein Z is a substituent selected from the group consisting of:

$$\begin{array}{cccc}
\text{CH}_3 & \text{CH}_3 & \text{CH}_3 & \text{CH}_3 \\
-\text{Si}-\text{CH}_3, & -\text{Si}-\text{CH}_3, & -\text{Si}-\text{CH}_3, & -\text{Si}-\text{CH}_3, \\
\text{CH}_3 & \text{CH}_2\text{CH}_3 & \text{CH}_2\text{CH}_2\text{CH}_3 & \text{CH}(\text{CH}_3)_2
\end{array}$$

$$\begin{array}{cccc}
\text{CH}_3 & \text{CH}_3 & \text{CH}_3 & \text{CH}_3 \\
-\text{Si}-\text{CH}_3, & -\text{Si}-\text{CH}_3, & -\text{Si}-\text{CH}_3, & -\text{Si}-\text{CH}_3, \\
\text{C}(\text{CH}_3)_3 & (\text{CH}_2)_3\text{CH}_3 & (\text{CH}_2)_6\text{CH}_3 & (\text{CH}_2)_7\text{CH}_3
\end{array}$$

$$\begin{array}{cccc}
\text{CH}_3 & \text{CH}_3 & \text{CH}_3 & \text{CH}_3 \\
-\text{Si}-\text{CH}_3, & -\text{Si}-\text{CH}_3, & -\text{Si}-\text{CH}_3, & -\text{Si}-\text{CH}_3, \\
(\text{CH}_2)_9\text{CH}_3 & (\text{CH}_2)_{16}\text{CH}_3 & \text{OCH}_3 & \text{OCH}_2\text{CH}_3
\end{array}$$

$$\begin{array}{cccc}
\text{CH}_3 & \text{CH}_3 & \text{CH}_3 & \text{CH}_3 \\
-\text{Si}-\text{CH}_3, & -\text{Si}-\text{CH}_3, & -\text{Si}-\text{CH}_3, & -\text{Si}-\text{CH}_3, \\
\text{C}_6\text{H}_5 & \text{CH}_2\text{Cl} & \text{CHCl}_2 & (\text{CH}_2)_3\text{Cl}
\end{array}$$

-continued
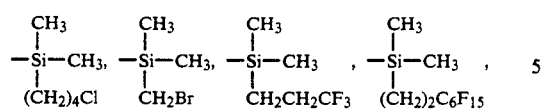
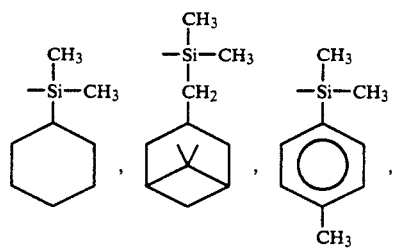
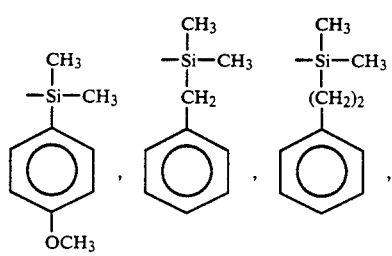
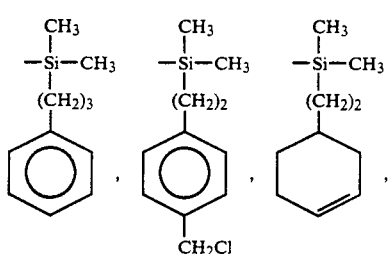
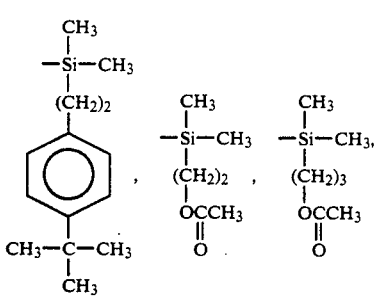
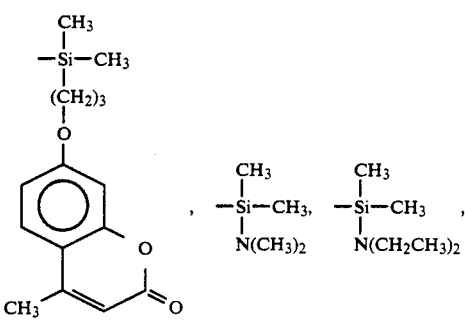
-continued
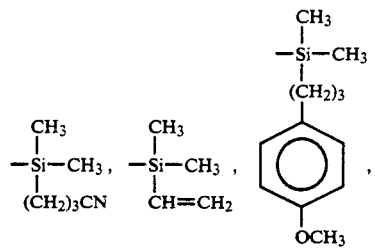
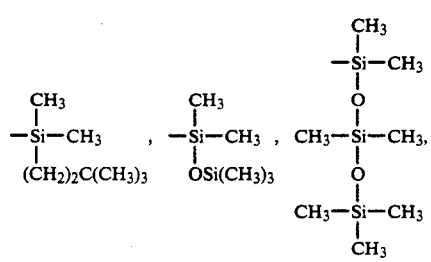
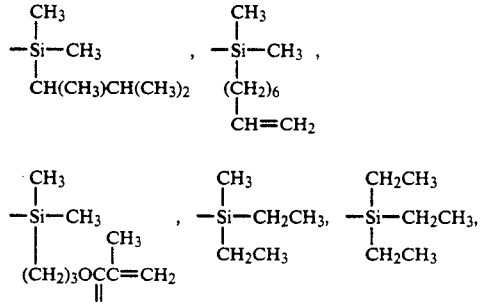
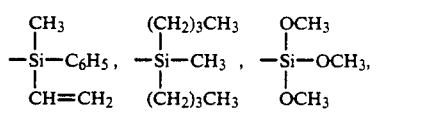
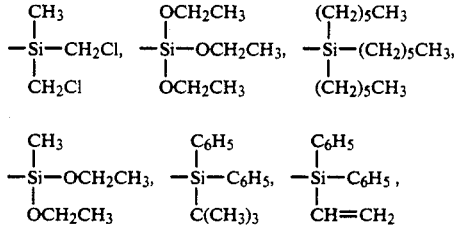
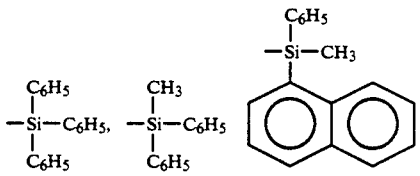
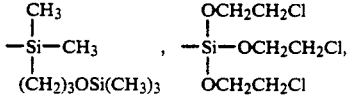
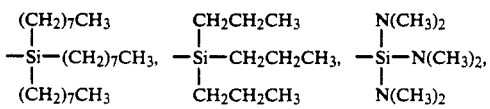

-continued

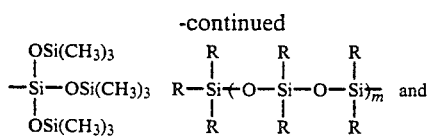

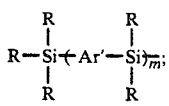

wherein R is a substituent selected from the group consisting of:

$CH_3$, $CH_3CH_2$, $(CH_2)_2CH_3$, $CH(CH_3)_2$, $C_6H_5$, $(CH_2)_2CF_3$;

wherein Ar' is a substituent selected from the group consisting of:

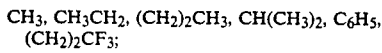

$CF_2$, $CF_2CF_2$, $OCF_2O$;

wherein p is a fraction (percentage) between 0.01 and 0.99;
wherein q is a fraction (percentage) equal to 1 minus p;
wherein n is an integer between 1 and 1000; and
wherein m is an integer between 1 and 1000.

3. The polyimide containing pendent siloxane groups of claim 1, wherein the repeating unit is (A) and Z is selected from the group consisting of:

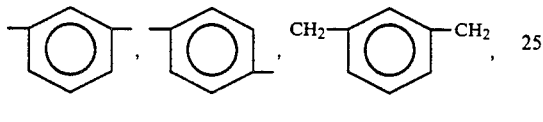

4. The random copolyimide containing pendent siloxane groups of claim 2, wherein the repeating unit is (A) and Z is selected from the group consisting of:

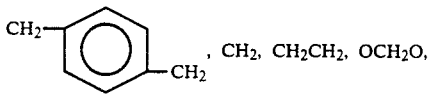

5. The polyimide containing pendent siloxane groups of claim 1, wherein the repeating unit is (B) and Z is:

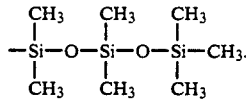

6. The polyimide containing pendent siloxane groups of claim 5, wherein Ar is selected from the group consisting of:

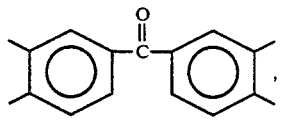

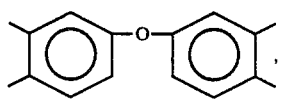

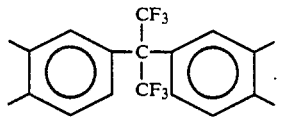

7. The polyimide containing pendent siloxane groups of claim 6, where X is a bond.

8. The random copolyimide containing pendent siloxane groups of claim 2, wherein the repeating unit is (B) and Z is selected from the groups consisting of:

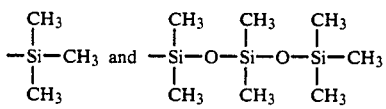

9. A process for synthesizing polyimides and random copolyimides containing pendent siloxane groups, which process comprises reacting a member selected from the group consisting of a chloroterminated silicon compound, a chloroterminated silicon oligomer, a hydrogen terminated compound, and a hydrogen terminated oligomer with a polyimide containing hydroxy groups in the presence of a platinic acid catalyst under ambient reaction conditions in a solvent selected from the group consisting of:
N,N-dimethylacetamide,
N-methylpyrrolidinone,
sulfolane,
N-cyclohexylpyrrolidinone,
dimethylsulfoxide,
toluene, and
bis(2-methoxyethyl)ether.

10. A polyimide containing pendent siloxane groups and having a structure selected from the group consisting of:

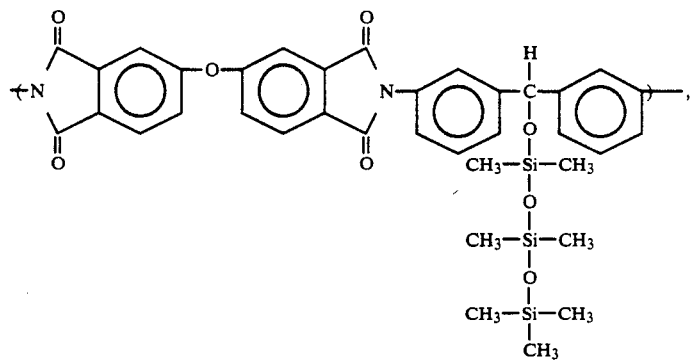
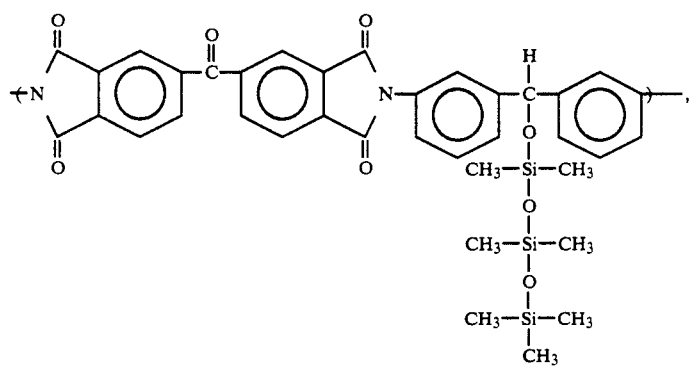
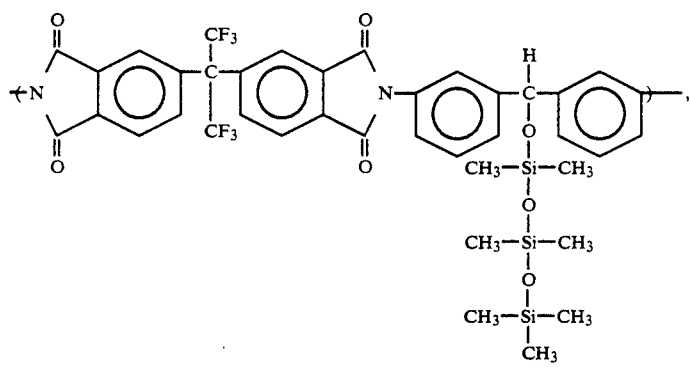
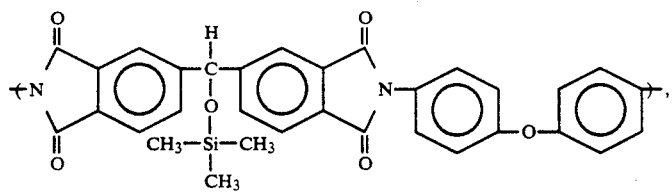
and

-continued
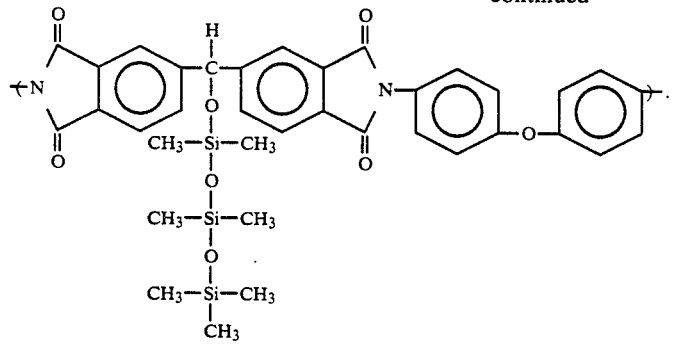
11. A random copolyimide containing pendent siloxane groups and having a structure selected from the group consisting of:
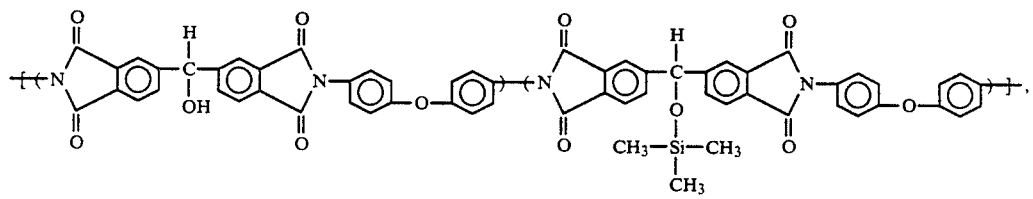
and
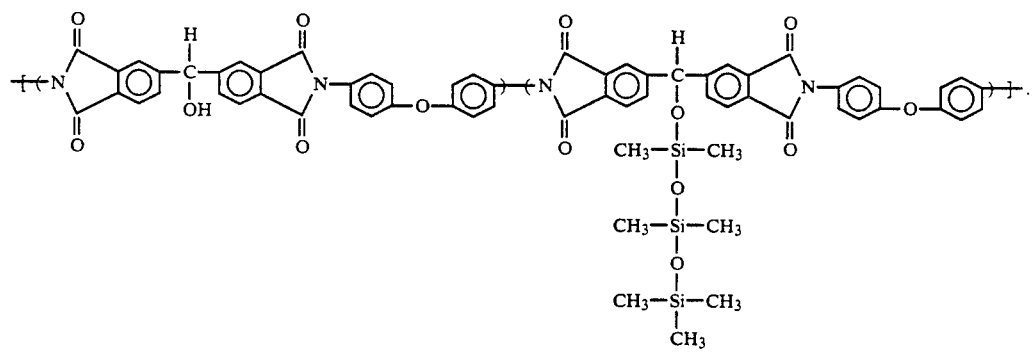
* * * * *